United States Patent [19]
Fallon et al.

[11] 3,868,470
[45] Feb. 25, 1975

[54] SEASONING INDIVIDUALLY QUICK FROZEN VEGETABLES

[75] Inventors: William M. Fallon, Tarrytown; Frank Paris, Ossining, both of N.Y.; Louis Bartenbach, Thornwood, N.J.

[73] Assignee: General Foods Corporation, White Plains, N.Y.

[22] Filed: Feb. 16, 1973

[21] Appl. No.: 333,245

[52] U.S. Cl. ............... 426/302, 426/393, 426/524
[51] Int. Cl. ....................... A23b 7/04, A23b 1/06
[58] Field of Search .......... 426/249, 302, 350, 524, 426/100, 101, 102, 103, 221, 222, 223, 313, 305

[56] References Cited
UNITED STATES PATENTS

| | | | |
|---|---|---|---|
| 2,190,226 | 6/1937 | Alexander | 426/249 |
| 3,424,591 | 1/1969 | Gold | 426/102 |
| 3,597,227 | 8/1971 | Murray | 426/102 |
| 3,607,313 | 9/1971 | Roth | 426/302 |
| 3,647,478 | 3/1972 | Minor | 426/249 |

*Primary Examiner*—Samih N. Zaharna
*Assistant Examiner*—Ernest G. Therkorn
*Attorney, Agent, or Firm*—Bruno P. Struzzi; Thomas V. Sullivan; Michael J. Quillinan

[57] ABSTRACT

Individually quick-frozen vegetable and other frozen food produce at a temperature below 10°F is contacted at high speeds by a spray of thickened cooled sauce having a freezing point of 15°–26°F and maintained at a temperature below 40°F and of a viscosity at the temperature of application which causes the sauce as applied to the product to flow only gradually thereover and provide a uniform deposit of sauce and allow freezing within less than ten minutes after application without migration.

5 Claims, No Drawings

SEASONING INDIVIDUALLY QUICK FROZEN VEGETABLES

INTRODUCTION

The present invention relates to a process whereby frozen foods of commerce can be edified or otherwise enhanced organoleptically by application of a seasoning sauce to the surfaces thereof under conditions which permit controlled sauce application and thus avoid undesired sauce migration.

BACKGROUND OF THE INVENTION

With the growth and industry-wide adoption of individual quick freezing (IQF) of vegetables and like produce prior to storage in suitably frozen totes and packaging thereafter as convenient, it has become desirable to apply an organoleptically appealing sauce to the individually frozen produce. Such sauces may be applied in a bar or tube form as an individual portion centered in the body off the individually quick-frozen charge to the frozen food carton. However, for many applications, employment of such a sauce-form is unnecessary and undesirable because of non-uniformities in applying the correct volume for seasoning purposes. It would be desirable to apply the sauce as a plug but to do so invites variations in sauce applications, particularly at high production rates.

It is among the objects of the present invention to provide a process whereby seasonings can be uniformly applied to individual and discretely frozen food produce and mixtures of such produce such as vegetable mixtures and combinations thereof with other like frozen foods such as meat, fruits and nut meats.

A more specific object of the invention is to provide a process whereby the sauce can be charged to the vegetable in a controllable manner at high production rates to an extent whereby the sauce applied in the package per se onto discrete frozen produce does not migrate to the bottom of the package and occasion freezing of container contents to the carton wall or other container panel structure. A further benefit and hence object of the invention is to control the application of such a seasoning sauce to frozen food as packaged whereby additional and complementary garnishes or toppings such as bread crumbs or croutons separately packaged in a pouch will not be "wetted" by the migration of the sauce applied to the food despite the presence of the package of topping in the frozen food container.

STATEMENT OF THE INVENTION

In accordance with the present invention a frozen vegetable or a mixed vegetable combination or like frozen product is prepared by methods commonly understood in the art and designated IQF to provide relatively discrete frozen produce which typically will be recovered from a tote bin in a free flowing form at a temperature ranging between 10°F and −10°F. This produce will be individually portioned and introduced into individual frozen food cartons which optionally will have included therein at the bottom thereof a foil pouch of suitable topping such as bread crumbs or croutons. The vegetable or other free flowing food product in the opened container carton or like structure will then have applied in the form of an aqueous "plug" or extrudate having a freezing point of 15°–26°F. a viscous suspension composed of seasoning, water and hydrocolloid such as a pregelatinized starch, the extrudate being maintained at a temperature below 40°F and typically between 30°–35°F. and being applied centrally of the frozen charge as it moves to receive the seasoning portion. The suspension is formulated with a viscosity of 1000 to 17,000 cps., preferably about 3500 to 5500 cps. upon standing at 30°–40°F. for up to 2 hours stemming from the inclusion of a colloid such as pre-gelatinized starch in a quantity therein sufficient to assure that the reduced temperatures of application the sauce quantity will not migrate or "bleed" to adhere to the container walls or otherwise collect upon being applied. Rather, the suspension will, upon intercepting contact with the IQF goods at below 10°F, undergo heat transfer therewith and migrate gradually thereover in a controlled manner such that the sauce quantity freezes in a period of less than ten minutes essentially in place on the goods and centrally of the charge.

The use of this process is important when large quantities of a seasoning preparation are to be accurately applied at high packaging or processing speed to the frozen produce since in doing so the likelihood of eccentricities of such sauce migration or collection is increased and the ability to co-pack with the product a separately packaged but included topping is limited.

Preferably the sauce will have included therein a sufficient level of pre-gelatinized tapioca starch as the hydrocolloid, the level of which will be dependent upon the viscometric characteristics of the starch and the level of sauce application. Also, the temperature at which the sauce is to be applied will bear upon this viscosity. Optionally, included in the sauce may be an oleaginous constituent such as margarine, butter or suitable seasoning oil which will endow the product with desired flavor attributes as recipe requires.

In accordance with its more critical aspects, it is the preferred practice to include a non-gelatinized starch as well as a gelatinized one in the total seasoning mixture applied in the spray of hydrocolloid solution. Typically, a mixture of 4.5% pre-gelatinized tapioca starch and 5.0% propoxylated tapioca starch by weight of the solution produces a viscosity between 1000 and 9000 centipoises over an elapsed 2 hour time of holding preparatory to spray application. By inclusion of the two types of colloids, that is, the relatively gelatinized and ungelatinized types, the sauce solution or suspension conditions are such that at the reduced temperatures that are necessarily practiced to effect the surface application the viscosity will not be so increased as to effect deposit of the suspension. However, under carefully controlled plant conditions where a holdup time of no longer than 40 minutes is practiced, it may be practical to eliminate the ungelatinized starch like that specified and instead rely upon pre-gelatinized starch solely for the dual function of providing sauce viscosity for application thereof to the goods as well as providing sauce rheological characteristics in the thawed and prepared vegetable. Generally, it is preferred to employ a level of starch in the pre-gelatinized form, say, a tapioca starch, which has freeze-thaw characteristics that assure it will not undergo a loss of functionality in frozen distribution.

Generally, hydrocolloid (pre-gelatinized starch) in the neighborhood of 1–5% of the sauce suspension and employing the foregoing propoxylated starch at a level ranging from 50–150% of the hydrocolloid may be employed to produce functional sauce viscosity for holding periods up to two hours prior to spraying.

The means for effecting application of the sauce suspension will in large measure be dictated by the choice of application. The most preferred embodiment of this invention employs an extruding nozzle reciprocating in line with the goods conveyed in a carton series in seriatem at high speeds, with metered interrupted application by the sauce proximate to the surface of the goods and forming a plug deposit within the perimeter of the contents of the container; employed in this way migration and bleeding to the surface of the container walls will be curtailed and instead a controlled collection of the sauce constituent in the geometric center of the charge will be assured, the sauce freezing as a mass collected at the middle of the container contents.

Among other preferred hydrocolloids of use are Xanthan gum, Carboxymethyl cellulose and mixtures thereof.

DESCRIPTION OF THE BEST OPERATIVE MODE OF THE INVENTION

A vegetable combination product consisting of 1 part sweet red peppers, 2½ parts pearl onions, 8 parts spinach, and 13½ parts zucchini is loaded volumetrically into a carton already containing a poly-foil pouch of crouton topping made as described in aforesaid copending application of Bartenbach. Each of these vegetables was previously individually quick frozen and packed in bulk at 0°F; they were then removed from refrigerated tote premises in the stated ratios and fed to a standard rotary vegetable loader at a temperature of 5°F.

A series of cartons were mechanically conveyed to a carton closure system. Prior to closure, 2½ parts sauce by weight of the aforesaid combination are added to each of two moving cartons simultaneously, the sauce filler moving with the cartons to insure uniform sauce distribution at the geometric center thereof; the filler moves back to fill the next succeeding two filled cartons on the line and the operation is repeated. The sauce consists of 1 part pre-gelatinized tapioca starch, 1 part propoxylated tapioca starch, 15 parts water, and 3 parts spices and flavorings (hydrolyzed vegetable protein, salt, sugar, onion powder, garlic powder and oregano). The sauce had previously been prepared by first pre-blending all dry materials. This pre-blending dispersed the starches within the other dry ingredients thereby reducing the probability of starch agglomeration within the sauce. This mix was then slowly added to chilled water at 35°F. under recirculation and rapid agitation. Agitation and recirculation were stopped when the correct sauce viscosity has been reached (1000–7000 cps), ideally 4000 cps. The sauce was then placed under slow agitation with minimum recycling during application at the filler stations.

The sauce issues from each applicator nozzle as a unitary plug approximately three-eighths inch in diameter and 1½ inch in length, the sauce being flowable and yet cohesive as it is deposited under gravity plus a moderate head pressure of about 10 psig. As the sauce comes into contact with the vegetable combination, the latter is moving and engages the lower free end of the plug occasioning a pulling and slight elongation as the plug is deposited in place. The carton is moved at a speed such as to fill 160 cartons per minute, each filler providing the parallel filling with 80 plugs per minute.

The plug has a freezing point of about 21°F. The plug of sauce froze in place within 10 minutes.

The packaged product when thawed and cooked developed a viscous sauce appearance by the addition of 0.06 parts of water to 1 parts of the sauce-vegetable combination and 0.12 parts butter, the vegetable moisture and added water serving with boiling and 3 minute simmer to thicken the sauce by the gelatinization of the propoxylated tapioca starch.

Whereas the invention has been described in one preferred embodiment in connection with extruding of a sauce onto goods within a container on a moving conveyor means, it is also applicable to the stationary application to the frozen food.

In all of these applications it will be essential that the freezing of the sauce as formulated and its viscosity consonant with this freezing point are regulated by formulation so that the sauce can be cooled to below 40°F prior to extrusion and yet will remain sufficiently fluid to permit ease of extrusion onto the charge of frozen food. Collaterally the produce will be at a temperature below 10°F and sufficiently reduced in relation to the sauce as applied that the latter will reasonably rapidly freeze in the region of application; accordingly, there should be a temperature differential at least 15°F between the frozen goods and the sauce.

What is claimed is:

1. The process of applying a seasoning sauce having a hydrocolloid therein in the form of an aqueous suspension to discretely frozen food products and mixtures thereof which comprises individually quick-freezing the food to a temperature below 10°F. in a free-flowing discrete form, charging the individually frozen food in said form to a moving open food carton to fill the contents thereof, introducing the moving filled food carton while at said reduced temperature to a sauce application zone, and applying the sauce from an extruding source that moves at a rate comparable to the rate of movement of the carton in said zone, said sauce being in the form of a flowable cohesive extruded plug at a temperature below 40°F. and above the freezing point thereof at a quantity and viscosity of 1,,000 to 17,000 cps such that the sauce upon contact commences to freeze and migrates slowly to produce a centrally located sauce charge on said food, the sauce composition having a freezing point of 15°–26° F., the sauce as applied freezing in a period less than 10 minutes and upon interception contact with the discrete food product charge undergoing such heat transfer as to migrate gradually thereover in place and centrally of the charge in the carton.

2. The process of claim 1 wherein the sauce applied to the food product is at a temperature differential of at least 15°F.

3. The process of claim 2 wherein the food being seasoned has a temperature of −10° F. to 10° F. just prior to the sauce plug being applied.

4. The process of claim 3 wherein the frozen food is portioned into separate containers and wherein the filled containers are moved in seriatim to said sauce application zone, said sauce being applied in an application pattern at the geometric center of the frozen food by causing the moving produce to intercept an extrudate of seasoning sauce at its applied.

5. The process of claim 1 wherein the hydrocolloid is a pre-gelatinized tapioca starch.

* * * * *

UNITED STATES PATENT OFFICE
CERTIFICATE OF CORRECTION

PATENT NO. : 3,868,470
DATED : Feb. 25, 1975
INVENTOR(S) : William M. Fallon, Frank Paris, Louis Bartenbach It is certified that error appears in the above-identified patent and that said Letters Patent are hereby corrected as shown below:

In the Abstract

Line 3, delete "spray" and insert -- plug --.

In the Statement of the Invention

Column 2, line 45 delete "spray".

Signed and sealed this 17th day of June 1975.

(SEAL)
Attest:

RUTH C. MASON
Attesting Officer

C. MARSHALL DANN
Commissioner of Patents
and Trademarks